US008852779B2

(12) United States Patent
Kim

(10) Patent No.: US 8,852,779 B2
(45) Date of Patent: Oct. 7, 2014

(54) BATTERY PACK

(75) Inventor: Tae-Yong Kim, Suwon-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 697 days.

(21) Appl. No.: 12/801,737

(22) Filed: Jun. 23, 2010

(65) Prior Publication Data

US 2011/0189522 A1  Aug. 4, 2011

(30) Foreign Application Priority Data

Feb. 1, 2010 (KR) .......................... 10-2010-0009158

(51) Int. Cl.
| | | |
|---|---|---|
| H01M 10/50 | (2006.01) | |
| H01M 2/00 | (2006.01) | |
| H01M 10/60 | (2014.01) | |

(52) U.S. Cl.
CPC ............... *H01M 10/50* (2013.01); *Y02E 60/12* (2013.01); *Y02T 10/7088* (2013.01); *Y02T 10/7005* (2013.01)
USPC ............................ 429/120; 429/148; 429/163

(58) Field of Classification Search
USPC ................................................ 429/121–347
See application file for complete search history.

(56) References Cited

U.S. PATENT DOCUMENTS

| | | | | |
|---|---|---|---|---|
| 5,569,552 | A  * | 10/1996 | Rao et al. ......................... | 429/72 |
| 6,042,961 | A  * | 3/2000 | Verhoog et al. .................. | 429/72 |
| 2002/0028375 | A1* | 3/2002 | Morishita et al. ............. | 429/120 |
| 2005/0170241 | A1* | 8/2005 | German et al. ............... | 429/120 |
| 2008/0193832 | A1 | 8/2008 | Doffin et al. | |
| 2009/0142653 | A1 | 6/2009 | Okada et al. | |
| 2010/0242516 | A1* | 9/2010 | Seo et al. ...................... | 62/259.4 |

FOREIGN PATENT DOCUMENTS

| | | | | |
|---|---|---|---|---|
| JP | 2008-059950 | A | 3/2008 | |
| JP | 2009-009888 | A | 1/2009 | |
| JP | 2009-134901 | A | 6/2009 | |
| KR | 10 2008-0050413 | A | 6/2008 | |
| KR | 100931272 | B1 * | 12/2009 | ................ F28C 1/02 |

OTHER PUBLICATIONS

Koran Office Action in KR 10-2010-0009158, dated Aug. 18, 2011 (Kim)
Korean Notice of Allowance in KR 10-2010-0009158, dated Nov. 21, 2011 (Kim).

* cited by examiner

*Primary Examiner* — Kenneth Douyette
*Assistant Examiner* — James Lee
(74) *Attorney, Agent, or Firm* — Lee & Morse, P.C.

(57) ABSTRACT

A battery pack including one or more battery modules, each battery module including one or more battery cells; a cover for accommodating the one or more battery modules, and a circulative fluid channel through which a cooling fluid flows, the circulative fluid channel being associated with the cover.

22 Claims, 8 Drawing Sheets

BATTERY PACK

BACKGROUND

1. Field

Embodiments relate to a battery pack.

2. Description of the Related Art

Secondary batteries are rechargeable batteries. Secondary batteries are broadly used in high-tech electronic devices, e.g., cellular phones, notebook computers and camcorders, and are also used in vehicles.

A secondary battery includes an electrode assembly and an electrolyte. The electrode assembly includes a positive plate, a negative plate, and a separator. The electrolyte may include, e.g., lithium ions. The positive and negative plates of the electrode assembly may include electrode tabs protruding outward.

The electrode assembly may be accommodated in a case and electrode terminals may be exposed outside the case. The electrode tabs may protrude outside the electrode assembly so as to be electrically connected to the electrode terminals. The case may have, e.g., a cylindrical shape or a rectangular shape.

A plurality of battery cells that are secondary batteries may be horizontally or vertically stacked so as to form a battery module. Also, a plurality of battery modules may be vertically and/or horizontally stacked so as to form one battery pack.

SUMMARY

Embodiments are directed to a battery pack, which represents advances over the related art.

It is a feature of an embodiment to provide a battery pack capable of improving cooling characteristics by emitting internal heat outward due to fluid circulation.

At least one of the above and other features and advantages may be realized by providing a battery pack including one or more battery modules, each battery module including one or more battery cells; a cover for accommodating the one or more battery modules; and a circulative fluid channel through which a cooling fluid flows, the circulative fluid channel being associated with the cover.

The cover may include a first cover facing outward; and a second cover disposed within the first cover and spaced apart from the first cover.

The circulative fluid channel may be between the first cover and the second cover.

The circulative fluid channel may contact an inner surface of the cover.

The circulative fluid channel may be bent on an inner surface of the cover.

The battery pack may further include a holder for supporting the one or more battery modules from one surface of the one or more battery modules.

The battery pack may further include a fluid tank detachably coupleable to one end of the circulative fluid channel, the fluid tank being configured to contain the cooling fluid; and a pump detachably coupleable to another end of the circulative fluid channel, the pump being configured to provide the cooling fluid in the fluid tank to the circulative fluid channel.

The battery pack may further include a holder for supporting the one or more battery modules from one surface of the one or more battery modules, the holder accommodating the fluid tank and the pump.

The cooling fluid may include air, water, a refrigerant, or ethanol and glycerin.

The one or more battery cells of each of the one or more battery modules may be stacked in a first direction, and the one or more battery modules may be stacked in at least one of second and third directions different from the first direction.

At least one of the above and other features and advantages may also be realized by providing a battery pack including one or more battery modules, each battery module including one or more battery cells; at least one supporting frame having at least one surface on which the one or more battery modules are stacked, a first fluid channel through which a cooling fluid flows, the first fluid channel being in the at least one supporting frame; a cover for accommodating the one or more battery modules; and a second fluid channel through which a cooling fluid flows, the second fluid channel being associated with the cover.

The first fluid channel and the second fluid channel may be connected to each other.

The cover may include a first cover facing outward; and a second cover disposed within the first cover and spaced apart from the first cover.

The second fluid channel may be between the first cover and the second cover.

The second fluid channel may contact an inner surface of the cover.

The second fluid channel may be bent on an inner surface of the cover.

The battery pack may further include a holder for supporting the one or more battery modules from one surface of the one or more battery modules.

The battery pack may further include a fluid tank detachably coupleable to one end of the second fluid channel, the fluid tank being configured to contain the cooling fluid; and a pump detachably coupleable to another end of the second fluid channel, the pump being configured to provide the cooling fluid in the fluid tank to the second fluid channel.

The battery pack may further include a holder for supporting the one or more battery modules from one surface of the one or more battery modules, the holder accommodating the fluid tank and the pump.

The battery pack may further include a plurality of supporting frames, and a distributor connected to a plurality of first fluid channels of the plurality of supporting frames, to the second fluid channel, and to the pump, the distributor being configured to distribute and provide the cooling fluid to the plurality of first fluid channels and to the second fluid channel.

The cooling fluid may include air, water, a refrigerant, or ethanol and glycerin.

At least one of the above and other features and advantages may also be realized by providing a battery pack that effects heat dissipation by way of a cooling fluid, the battery pack including one or more battery modules, each battery module including one or more battery cells; a cover for accommodating the one or more battery modules; and a circulative fluid channel, the circulative fluid channel being associated with the cover.

BRIEF DESCRIPTION OF THE DRAWINGS

The above and other features and advantages will become more apparent to those of ordinary skill in the art by describing in detail exemplary embodiments with reference to the attached drawings, in which:

FIG. 8 illustrates an electric car that employs the battery pack illustrated in

FIG. 1, according to an embodiment.

DETAILED DESCRIPTION

Figure 1:
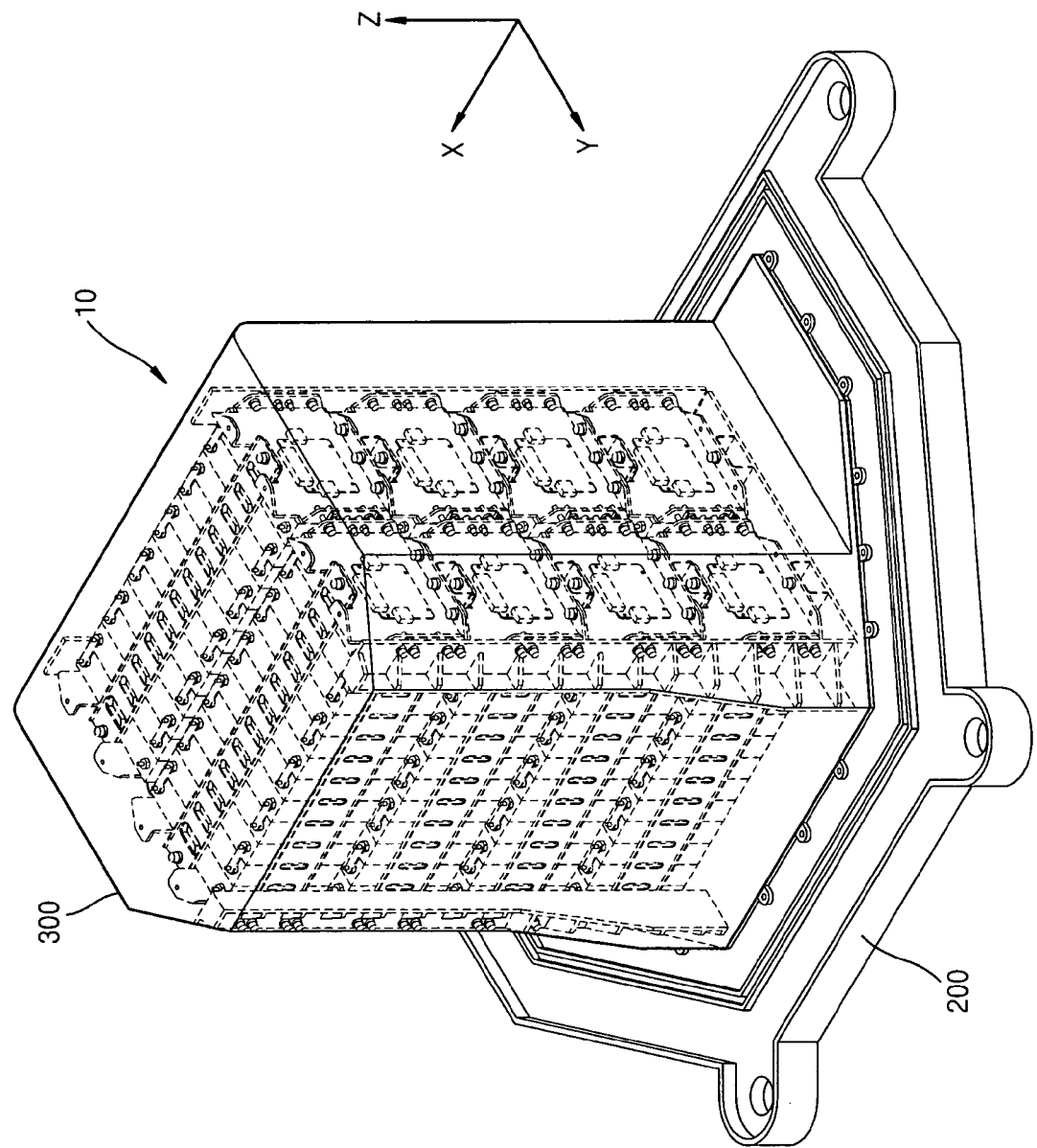
FIG. 1 illustrates a perspective view of a battery pack according to an embodiment.

Korean Patent Application No. 10-2010-0009158, filed on Feb. 1, 2010, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Figure 2:
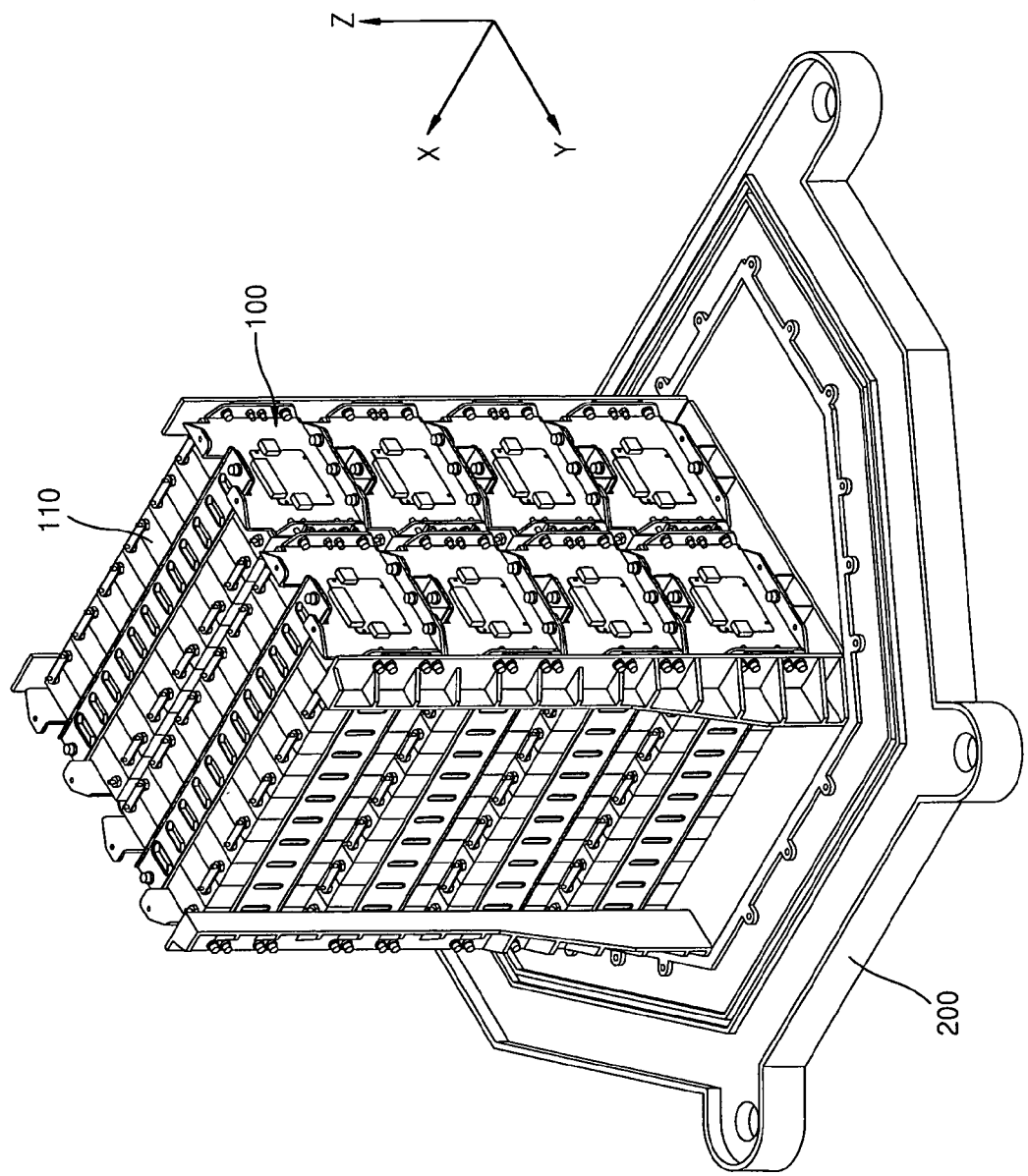
FIG. 2 illustrates a perspective view of the battery pack of FIG. 1 showing with a cover removed.
Figure 3:
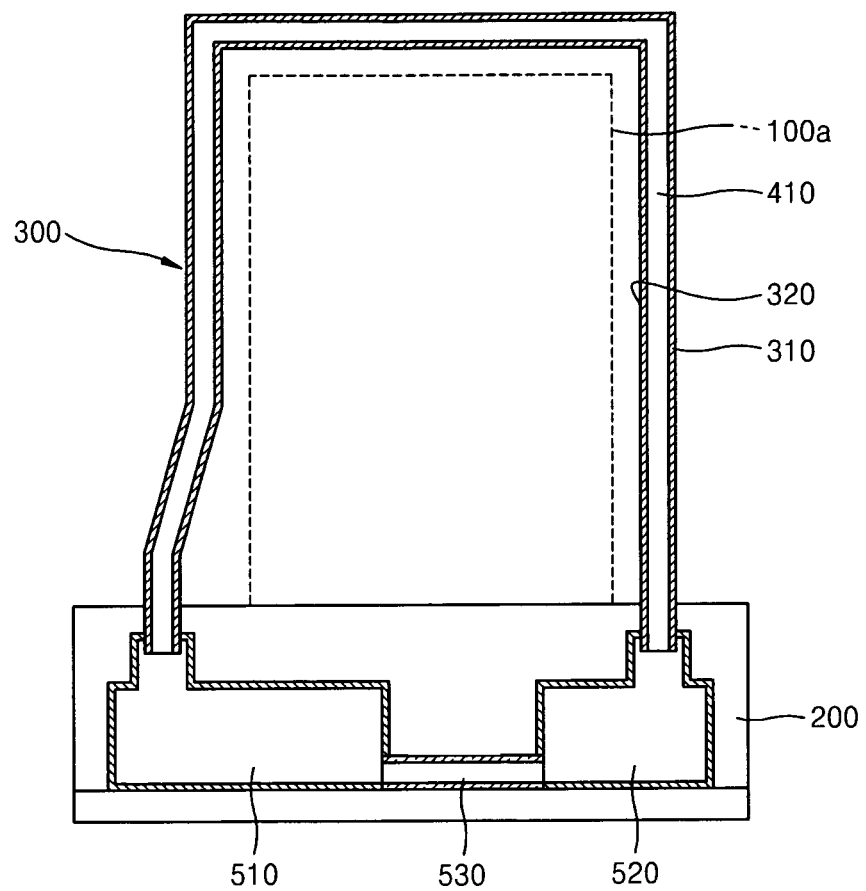
FIG. 3 illustrates a cross-sectional view of the battery pack of FIG. 1 showing a circulative fluid channel between an outer cover and an inner cover.

FIG. 1 illustrates a perspective view of a battery pack 10 according to an embodiment. FIG. 2 illustrates a perspective view of the battery pack 10 of FIG. 1 with a cover 300 removed. FIG. 3 illustrates a cross-sectional view of the battery pack 10 of FIG. 1 showing a circulative fluid channel 410 between an outer cover 310 and an inner cover 320.

Referring to FIGS. 1, 2, and 3, the battery pack 10 may be formed by vertically and/or horizontally stacking battery modules 100. Each of the battery modules 100 may include one or more battery cells 110 that are stacked to form one body. The battery cells 110 may generate heat during recharge and discharge operations; and if not dissipated, the generated heat may reduce performance and lifetime of the battery cells 110.

In particular, since a large number of battery cells 110 may be stacked on one another in the battery pack 10, the heat generated from the battery cells 110 may be increased. The battery pack 10 may absorb and emit internal heat outward by using the circulative fluid channel 410 or a circulative pipe on the cover 300 through which a cooling fluid flows. Accordingly, the battery pack 10 may efficiently dissipate internal heat.

The battery pack 10 may be installed in an electric car or a hybrid car that operates using electricity. The battery pack 10 included in the electric car or the hybrid car may be installed using a quip drop method so as to be detachable from the electric car or the hybrid car.

An interior of the battery pack 10 may be cooled by providing and circulating the cooling fluid through the circulative fluid channel 410 so as to absorb heat and then cooling the cooling fluid. The circulative fluid channel 410 may be disposed on the cover 300 to increase cooling efficiency of the battery pack 10.

The cooling fluid may be provided to the circulative fluid channel 410 through a fluid tank 510 and a pump 520 disposed in a holder 200. Since the cover 300 may be separated from, i.e., may be detachably coupleable to, the battery pack 10 for maintenance or recharge, the circulative fluid channel 410 may be detachably coupleable to the fluid tank 510 and the pump 520.

A general battery pack attached using a quick drop method may need to be entirely exchanged. Thus, application of the above-described circulative cooling method may be restrictive. However, in the battery pack 10 of an embodiment, the circulative fluid channel 410 may be disposed on the cover 300 and may be detachably coupleable to the fluid tank 510 and the pump 520 of the holder 200. Thus, the circulative cooling method and device may be easily applied to the battery pack 10 using a quick drop method.

With use, characteristics of the cooling fluid may deteriorate or an amount of the cooling fluid may become insufficient. However, the battery pack 10 may include the separable cover 300 so as to easily exchange and/or refill the cooling fluid at a certain place, e.g., an electricity charging station. Accordingly, cooling characteristics of the battery pack 10 may be improved and/or restored.

As illustrated in FIGS. 1, 2, and 3, the battery pack 10 may include the battery modules 100; the holder 200; and the cover 300.

Each of the battery modules 100 may include one or more battery cells 110. The holder 200 may support one or more battery modules 100 at one surface of the battery modules 100. The cover 300 may be detachably coupleable to the holder 200 so as to accommodate the battery modules 100. The circulative fluid channel 410 through which the cooling fluid circulates may be disposed on the cover 300.

The holder 200 may support one or more battery modules 100 from a lower surface of the battery modules 100. That is, the battery modules 100 may be vertically and/or horizontally stacked on the holder 200. An additional thermal management system (TMS) for cooling heat of the battery modules 100 may be formed in the holder 200.

However, in the battery pack 10, the circulative fluid channel 410 may dissipate internal heat by using circulative cooling method; and the additional TMS may not be included.

The cover 300 may be detachably coupleable to the holder 200 so as to accommodate the battery modules 100. Accordingly, the cover 300 may protect the battery modules 100 from an outer environment.

Figure 4:
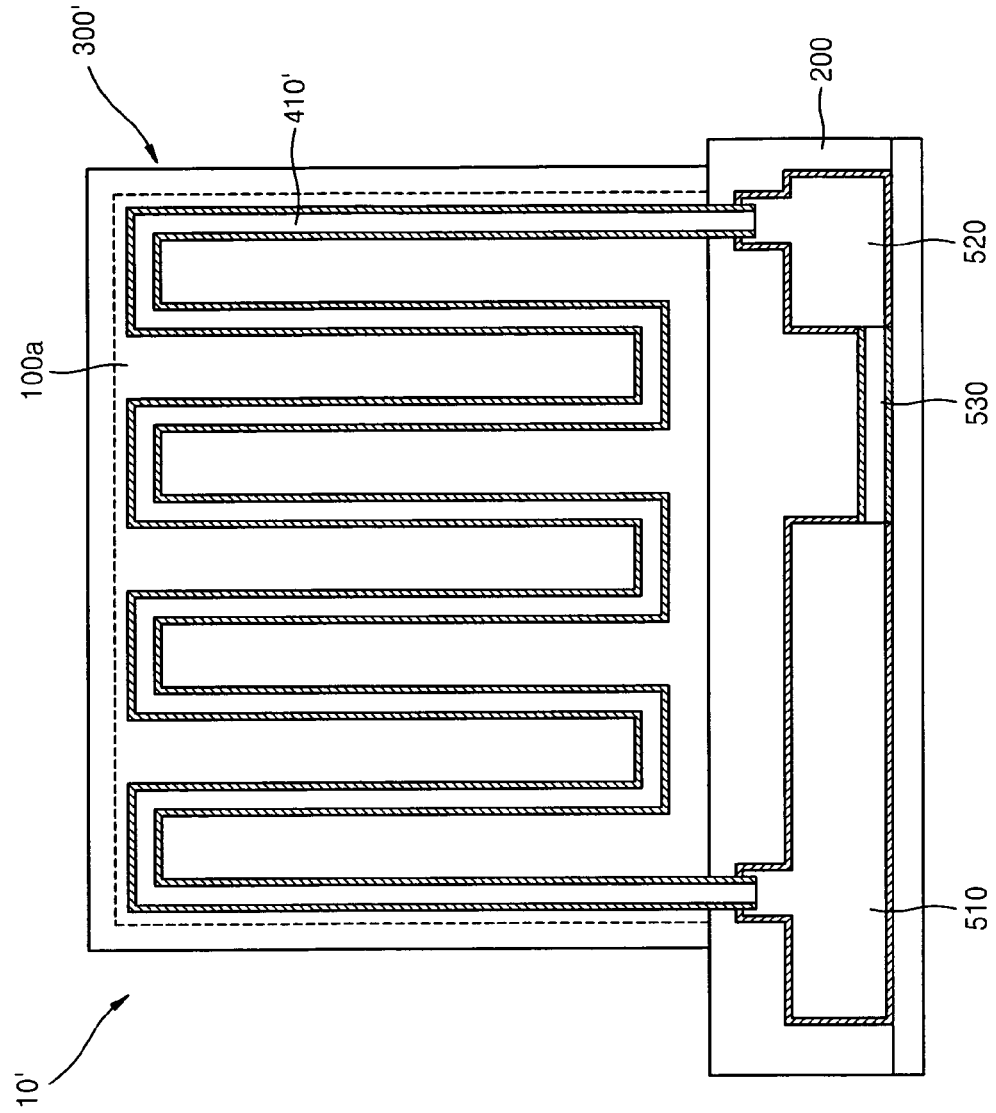
FIG. 4 illustrates a cross-sectional view of the battery pack of FIG. 1 showing a circulative pipe bent on an inner surface of a cover.

Heat may be mostly generated from the battery cells 110 of the battery modules 100 and may be absorbed by the cooling fluid that flows through the circulative fluid channel 410. The circulative fluid channel 410 may contact an inner and/or outer surface of the cover 300. In an implementation, as illustrated in FIGS. 3 and 4, the circulative fluid channel 410 may contact an inner surface of the case cover 300 or 300'.

The cover 300 may have a dual structure. In particular, the cover 300 may include a first cover, e.g., an outer cover 310, and a second cover, e.g., an inner cover 320. The outer cover 310 may be exposed to an exterior of the battery module 10; and the inner cover 320 may be disposed within the outer cover 310 and spaced apart from the outer cover 310. In this case, the circulative fluid channel 410 may surround a battery region 100a in which the battery cells 110 are disposed.

The circulative fluid channel 410 may include, i.e., may be disposed within, a space between the outer cover 310 and the inner cover 320. The circulative fluid channel 410 may take the form of a pipe between the outer cover 310 and the inner cover 320. In an implementation, the circulative fluid channel 410 may be bent in order to increase an area for contacting the internal space of the battery pack 10.

If an area in which the circulative fluid channel 410 contacts the internal space of the battery pack 10 is increased, the cooling fluid that flows through the circulative fluid channel 410 may absorb more heat. Accordingly, the cooling efficiency of the battery pack 10 due to the cooling fluid circulating in the circulative fluid channel 410 may be improved.

The cooling fluid that flows through the circulative fluid channel 410 and absorbs internal heat of the battery pack 10 may include, e.g., air, water, a refrigerant, or ethanol and glycerin. However, the cooling fluid is not limited thereto and may also include various other materials including, e.g., a phase change material (PCM), which may flow through the circulative fluid channel 410.

The cooling fluid may be contained in the fluid tank 510 and may be provided to the circulative fluid channel 410 by the pump 520. The fluid tank 510 and the pump 520 may be connected via a connection pipe 530. In this case, the cooling fluid in the fluid tank 510 may be provided to the pump 520 through the connection pipe 530 and may be provided to the circulative fluid channel 410 by the pump 520.

The fluid tank 510 may be detachably coupleable to one end of the circulative fluid channel 410 so as to be separated from the circulative fluid channel 410 when the cover 300 is removed. Also, the pump 520 may be detachably coupleable to another end of the circulative fluid channel 410 so as to be separated from the circulative fluid channel 410 when the cover 300 is removed.

As illustrated in FIG. 3, the fluid tank 510 and the pump 520 may be accommodated in the holder 200. In this case, the cover 300 may be detachably coupled to the holder 200. The fluid tank 510 and the pump 520 may be fixed in the holder 200 and may be separated from the circulative fluid channel 410 of the cover 300 when the cover 300 is separated from the holder 200.

According to another embodiment, as illustrated in FIG. 4, in the battery pack 10', the circulative fluid channel 410 may be substituted by a circulative pipe 410' that is bent on an inner surface of a cover 300'. In this case, the cover 300' may not be formed in a dual structure, i.e., may not have an inner cover and an outer cover, and thus may be formed more easily.

Figure 5:
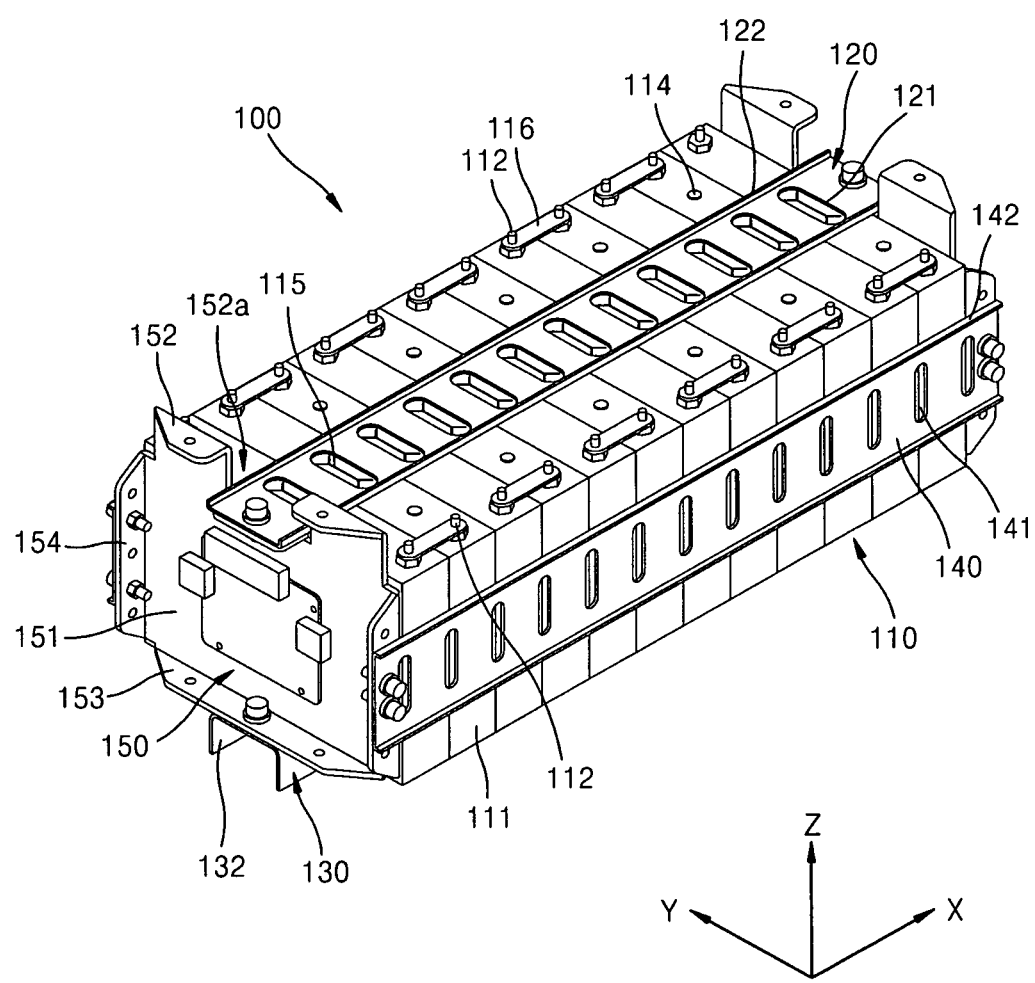
FIG. 5 illustrates a perspective view of a battery module included in the battery pack of FIG. 1 and formed by stacking a plurality of battery cells.

FIG. 5 illustrates a perspective view of a battery module 100 included in the battery pack 10 of FIG. 1 and formed by stacking a plurality of battery cells 110. The battery module 100 may be formed by stacking the battery cells 110 in a first direction, e.g., the X direction. The battery pack 10 may be formed by stacking a plurality of battery modules 100 in a second direction, e.g., the Z direction, and/or a third direction, e.g., the Y direction.

Referring to FIG. 5, the battery module 100 may include one or more battery cells 110 stacked on one another. The battery module 100 may include the battery cells 110, an upper frame 120, a lower frame 130, side frames 140, and end plates 150.

The battery cells 110 may be stacked in the first direction, e.g., the X direction. The upper frame 120 may support the battery cells 110 from one surface, e.g., an upper surface, of the battery module 100. The lower frame 130 may support the battery cells 110 from another surface, e.g., a lower surface, of the battery module 100. The side frames 140 may support the battery cells 110 from side surfaces of the battery module 100. The end plates 150 may support the battery cells 110 from two ends of the battery module 100.

A plurality of battery cells 110 may be stacked in the first direction so as to form the battery module 100. The upper frame 120 may be disposed on the battery cells 110 stacked in the first direction and may support the battery cells 110 from upper surfaces of the battery cells 110. The lower frame 130 may be disposed under the battery cells 110 stacked in the first direction and may support the battery cells 110 from lower surfaces of the battery cells 110.

A pair of the side frames 140 may be disposed at sides of the battery cells 110 stacked in the first direction and may support the battery cells 110 from side surfaces of the battery cells 110. A pair of the end plates 150 may be disposed at two ends of the battery cells 110 stacked in the first direction and may support the battery cells 110 from the ends of the battery cells 110.

Here, the first direction may be the X direction and the second direction may be the Z direction. In this case, if the battery pack 10 is horizontally disposed, the X direction may be a horizontal direction and the Z direction may be a vertical direction. However, the X and Y directions are not limited thereto and may be differently regarded according to the direction of the battery pack 10.

A plurality of battery cells 110 may be stacked in the horizontal direction so as to form the battery module 100 and may generally have, e.g., a rectangular shape, as illustrated in FIG. 5. However, the battery cells 110 are not limited to the rectangular shape and may also have various shapes, e.g., a cylindrical shape or a pouch shape.

The battery cells 110 may be secondary batteries. The secondary battery may include an electrode assembly and an electrolyte. The electrode assembly may include a positive plate, a negative plate, and a separator. The electrolyte may contain lithium ions. The positive and negative plates of the electrode assembly may be electrically connected to a current collector so as to protrude outward.

The electrode assembly may be accommodated in a case 111; and electrode terminals 112 may be exposed outside the case 111. The current collector electrically connected to the positive and negative plates may be electrically connected to the electrode terminals 112. The case 111 may have a cylindrical shape or a rectangular shape. A battery cell 110 may include a plurality of electrode assemblies in one case 111.

A plurality of battery cells 110 may be horizontally stacked so as to form the battery module 100. In the battery module 100, the electrode terminals 112 of neighboring battery cells 110 may be electrically connected to each other. In this case, the electrode terminals 112 of the neighboring battery cells 110 may be electrically connected by using bus bars 116.

The neighboring battery cells 110 may be disposed so that polarities of adjacent terminals thereof are opposite to each other. A plurality of battery cells 110 may be connected in parallel, in series, or in parallel and series. Accordingly, the battery cells 110 may be sequentially connected to each other so as to form one battery module 100. Connection methods and numbers of battery cells 110 to be stacked may be determined in consideration of desired capacities of recharge and discharge when the battery cells 110 are designed.

A cap plate 113 may be coupled to an opening of the case 111. The cap plate 113 may be a thin plate. An electrolyte inlet for injecting the electrolyte into the case 111 may be formed in the cap plate 113. The electrolyte inlet may be sealed with a sealing plug 114 after the electrolyte is injected.

A vent member 115 in which grooves are formed may be formed on the cap plate 113 such that the vent member 115 may be broken when a predetermined internal pressure is reached. If the upper frame 120 is disposed on the battery cells 110 that are horizontally stacked, exhaust outlets 121 of the upper frame 120 may be disposed on vent members 115.

The battery cells 110 may be lithium-ion secondary batteries. However, the battery cells 110 are not limited to the lithium-ion secondary batteries and may also be various batteries, e.g., nickel-cadmium secondary batteries, nickel-hydrogen secondary batteries, or lithium batteries.

In each of the battery cells 110 containing lithium, the electrode assembly may expand or contract when recharge or discharge occurs. In this case, the expansion and the contraction of the electrode assembly may apply physical force to the case 111. As such, the case 111 may physically expand and contract in correspondence with the expansion and the contraction of the electrode assembly.

The case 111 may be deformed due to repeated expansion and contraction. The expansion in volume may increase resistance and reduce the efficiency of the battery cells 110. In order to prevent the reduction in efficiency, the end plate 150 may support the battery cells 110 from two ends of the battery cells 110. As such, a predetermined level of pressure may be applied to the battery cells 110.

Also, the battery cells 110 may generate heat during recharge and discharge operations. The generated heat may reduce the performance and lifetime of the battery cells 110. Accordingly, the battery pack 10 may absorb and emit internal heat outward by using a cooling fluid that flows through the circulative fluid channel 410 illustrated in FIG. 3 or the circulative pipe 410' illustrated in FIG. 4.

A pair of the end plates 150 may be disposed at two ends of the battery cells 110 stacked in the horizontal direction and/or the vertical direction and electrically connected to each other. Also, the upper frame 120, the lower frame 130, and the side frames 140 may be supported by vertical or side surfaces of the end plates 150 and may compress and fix the battery cells 110 such that the battery cells 110 do not extend in the horizontal direction due to expansion and contraction.

The end plates 150 may be disposed at two ends of the battery module 100. One surfaces of the end plates 150 may contact outer surfaces of the battery cells 110 at two outermost sides of the battery module 100 such that the battery cells 110 are supported by the end plates 150.

Each of the end plates 150 may include a base plate 151 and flanges 152, 153, and 154. The base plate 151 may have a size that is sufficient to cover an outer surface of the battery cells 110. Although the base plate 111 has an almost square shape in FIG. 5, the shape of the base plate 111 is not limited thereto. The flanges 152, 153, and 154 may be bent from the base plate 151 away from the battery cells 110.

The flanges 152, 153, and 154 may include upper flanges 152, a lower flange 153, and side flanges 154. The lower flange 153 may be coupled to the lower frame 130. The side flanges 154 may be correspondingly coupled to the side frames 140.

A plurality of battery modules 100 may be vertically and/or horizontally stacked so as to form the battery pack 10. In this case, the end plates 150 of neighboring battery modules 100 may be coupled to each other so as to support each other.

In this case, the upper flanges 152 of one battery module 100 may be coupled to the lower flange 153 of an upper battery module 100. The lower flanges 153 of one battery module 100 may be coupled to the upper flanges 152 of a lower battery module 100. The side flanges 154 of one battery module 100 may be coupled to the side flanges 154 of horizontally neighboring battery modules 100.

In this case, the upper, lower, and side flanges 152, 153, and 154 may be respectively screw-coupled to the upper, lower, and side frames 120, 130, and 140 with bolts and nuts. However, the connection method is not limited thereto; and the upper, lower, and side flanges 152, 153, and 154 may be respectively coupled to the upper, lower, and side frames 120, 130, and 140 by using various methods, e.g., a welding method.

The upper frame 120 may be disposed on the battery cells 110 stacked in the horizontal direction. In this case, the exhaust outlets 121 may be formed in the upper frame 120 in correspondence with the vent members 115 of the battery cells 110.

The upper frame 120 may have upper frame bent portions 122 bent from lengthwise edges of the upper frame 120. A sealing member may be disposed on inner surfaces of the upper frame bent portions 122. The sealing member may be formed of an elastic material, e.g., rubber. The upper frame 120 may be coupled to the lower frame 130 of an upper battery module 100 by interposing the sealing member therebetween so as to form a sealed gas passage for discharging a gas.

Sealing rings may be disposed between the upper frame 120 and the vent members 115 such that a gas ejected from the vent members 115 may flow outward through the exhaust outlets 121 of the upper frame 120 without influencing neighboring battery cells 110.

The sealing rings may be, e.g., O rings. In this case, grooves 152a in which the upper frame 120 is to be disposed may be formed at a middle of upper edges of the end plates 150. Accordingly, the exhaust outlets 121 of the upper frame 120 may contact the battery cells 110.

Also, the sealing rings between the battery cells 110 and the upper frame 120 may have a sufficient thickness. Thus, when the upper frame 120 is coupled to the end plates 150, the upper frame 120 may apply pressure on the battery cells 110 so as to compress the sealing rings disposed therebetween and thus the upper frame 120 may contact the battery cells 110.

The lower frame 130 may be disposed under the battery cells 110 so as to support the weight of the battery cells 110 and may be connected to the lower flanges 153 of the end plates 150. In order to support the weight of the battery cells 110, the lower frame 130 may include lower frame bent portions 132 bent away from the battery cells 110.

The lower frame bent portions 132 may be bent downward. Also, the lower frame bent portions 132 may be coupled to the upper frame 120 of the lower battery module 100 so as to form a gas passage. In this case, the gas passage formed by coupled the lower frame 130 of one battery module 100 and the upper frame 120 of the lower battery module 100 may function as a degassing duct for discharging a generated gas.

In this case, the lower frame 130 of the current battery module 100 and the upper frame 120 of the lower battery module 100 may degas in a sealed state or may induce degassing even in an incompletely sealed state. A gas generated in the battery cells 110 may cause an explosion or a rapid chemical reaction corresponding to an explosion, and thus an amount of the gas may be explosively increased in a short time. Thus, if a degassing duct is formed in the battery pack 10, the gas may be easily discharged.

The side frames 140 may be disposed at sides of the battery cells 110 so as to support the battery cells 110 from side surfaces of the battery cells 110. The side frames 140 may extend by a uniform width from one of the end plates 150 to another of the end plates 150.

One or more through holes 141 may be formed in each of the side frames 140 so as to reduce the weight of the side frames 140. Also, the side frames 140 may include side frame bent portions 142 bent away from the battery cells 110. The side frame bent portions 142 may increase the strength of the side frames 140 against bending.

Figure 6:
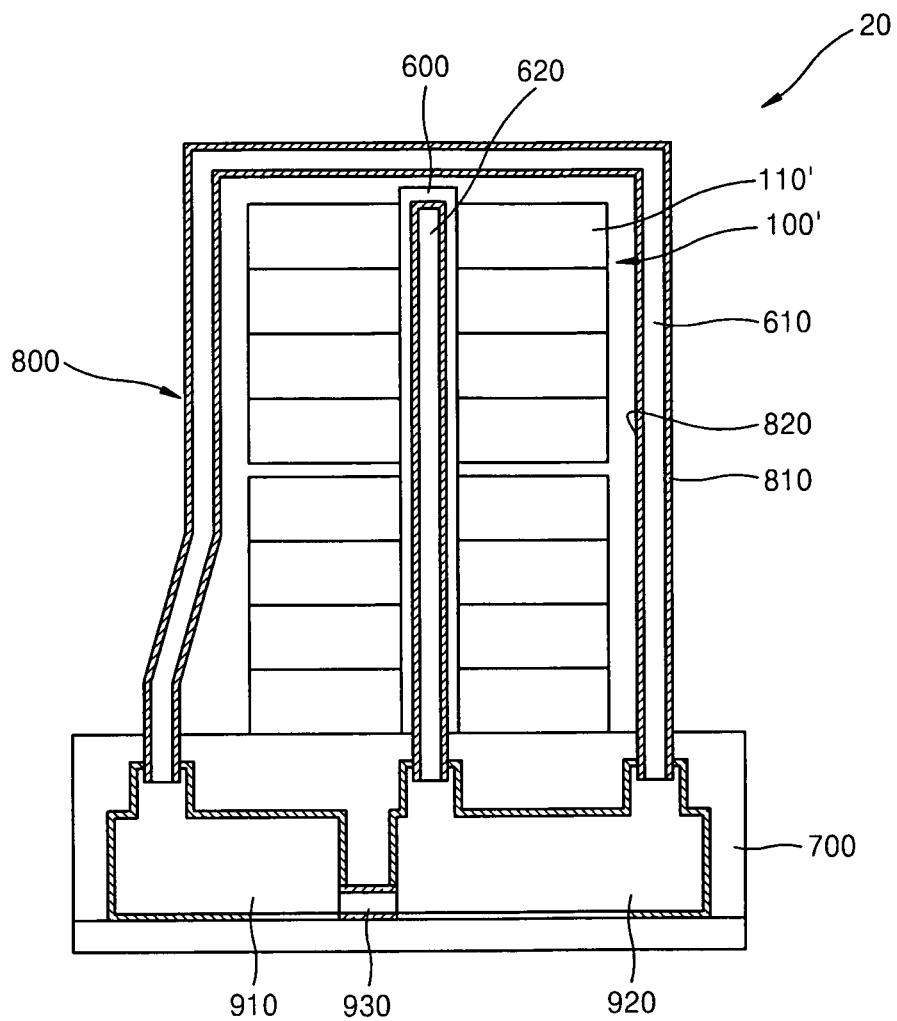
FIG. 6 illustrates a cross-sectional view of a battery pack including a supporting frame in which a heating fluid channel is formed, according to another embodiment.

FIG. 6 illustrates a cross-sectional view of a battery pack 20 including a supporting frame 600 in which a first fluid channel, e.g., a heating fluid channel 620, is disposed, according to another embodiment.

Referring to FIG. 6, the battery pack 20 may include battery modules 100'; a holder 700, and a cover 800. Compared to the battery pack 10 of FIG. 2, in the battery pack 20 of the present embodiment, battery cells 110 may be supported by two side surfaces of the supporting frame 600 and the first fluid channel, e.g., the heating fluid channel 620, may be disposed in the supporting frame 600. Repeated descriptions on identical elements of the battery pack 10 will not be provided here.

Here, a cooling fluid may flow through the heating fluid channel 620, may absorb heat generated from the battery cells 110, and may emit the absorbed heat to an exterior of the battery pack 20. Accordingly, the heating fluid channel 620 may efficiently dissipate the heat generated from the battery cells 110.

Each of the battery modules 100' may include one or more battery cells 110. The holder 700 may support one or more battery modules 100' from one surface of the battery pack 20. The cover 800 may be detachably coupleable to the holder 700 and may accommodate the battery modules 100'.

A second fluid channel through which the cooling fluid flows, e.g., a circulative fluid channel 610, may be formed on the cover 800. In this case, the circulative fluid channel 610 may be connected to the heating fluid channel 620 and thus the cooling fluid may flow through the circulative fluid channel 610 and the heating fluid channel 620 by one pump 920.

The cover 800 may have a dual structure. In particular, the cover 800 may include a first cover, e.g., an outer cover 810, and a second cover, e.g., an inner cover 820. The circulative fluid channel 610 may include a space between the outer cover 810 and the inner cover 820. The circulative fluid channel 610 may be in the form of a pipe between the outer cover 810 and the inner cover 820. In this case, the circulative fluid channel 610 may be bent in order to increase an area for contacting the internal space of the battery pack 20.

The cooling fluid that flows through the circulative fluid channel 610 and absorbs internal heat of the battery pack 20 may include, e.g., air, water, a refrigerant, or ethanol and glycerin. However, the cooling fluid is not limited to the above materials; and may also include various other materials including, e.g., a phase change material (PCM), which may flow through the circulative fluid channel 610.

The cooling fluid may be contained in a fluid tank 910 and may be provided to the circulative fluid channel 610 by the pump 920. The fluid tank 910 and the pump 920 may be connected via a connection pipe 930. The fluid tank 910 and the pump 920 may be accommodated in the holder 700. In this case, the cover 800 may be detachably coupleable to the holder 700.

In the battery pack 20, the battery cells 110 may be supported by two side surfaces of the supporting frame 600. As described above, the heating fluid channel 620 may be disposed in the supporting frame 600. The cooling fluid may flow through the heating fluid channel 620 and may absorb heat generated from the battery cells 110.

The circulative fluid channel 610 and the heating fluid channel 620 may be connected to each other so as to form one circulative loop. The cooling fluid may flow through the circulative fluid channel 610 and the heating fluid channel 620 by one fluid tank 910 and one pump 920. As the cooling fluid absorbs internal heat of the battery pack 20 while flowing through the circulative fluid channel 610 and the heating fluid channel 620, the cooling efficiency of the battery pack 20 may be increased.

Figure 7:
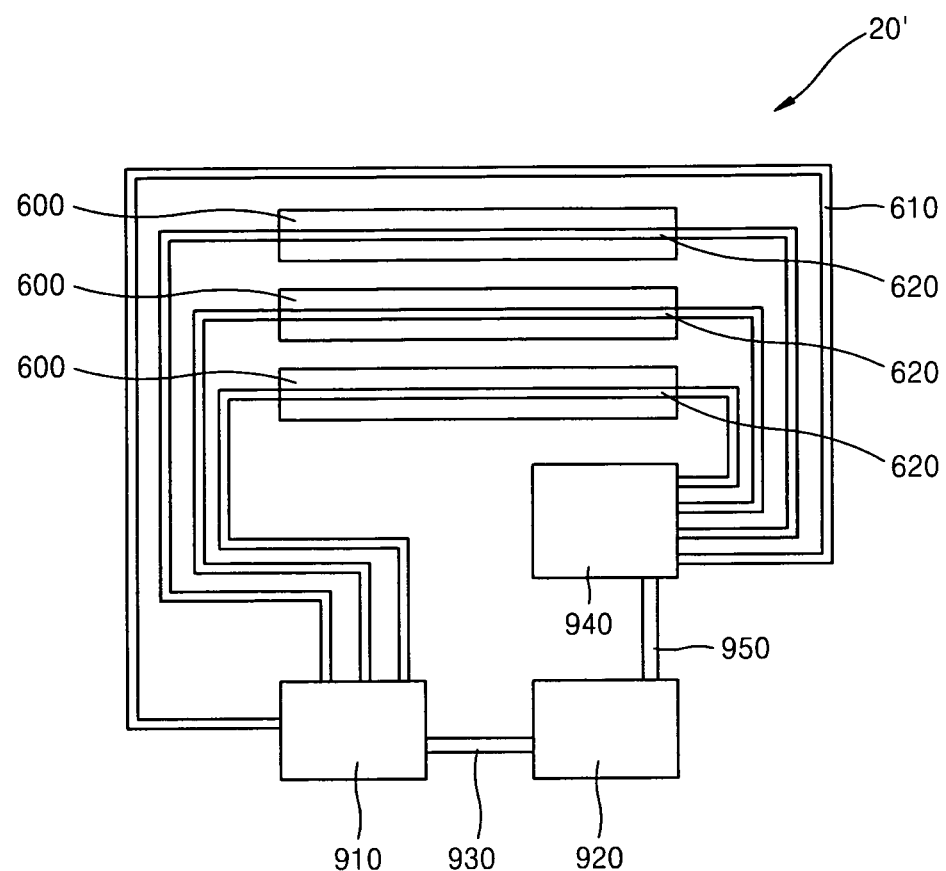
FIG. 7 illustrates a schematic diagram of connections between a distributor, a circulative fluid channel, and a plurality of heating fluid channels in a battery pack including a plurality of supporting frames in which the heating fluid channels are formed, according to another embodiment.

FIG. 7 illustrates a schematic diagram showing connections among a distributor 940, a circulative fluid channel 610, and heating fluid channels 620 in a battery pack 20' including a plurality of supporting frames 600 in which the heating fluid channels 620 are formed, according to another embodiment.

Referring to FIG. 7, the battery pack 20' may include a plurality of supporting frames 600. A heating fluid channel 620 may be disposed in each of the supporting frames 600. A cooling fluid may be provided to a plurality of the heating fluid channels 620 by at least one pump 920.

In order to achieve this, the battery pack 20' may include the distributor 940. The distributor 940 may be connected to the heating fluid channels 620 and/or the circulative fluid channel 610 and the pump 920. The distributor 940 may be connected to the pump 920 via an additional connection pipe 950.

The distributor 940 may be connected to the heating fluid channels 620 and/or the circulative fluid channel 610, may receive the cooling fluid from the pump 920, and may distribute the cooling fluid to the heating fluid channels 620 and/or the circulative fluid channel 610.

Figure 8:
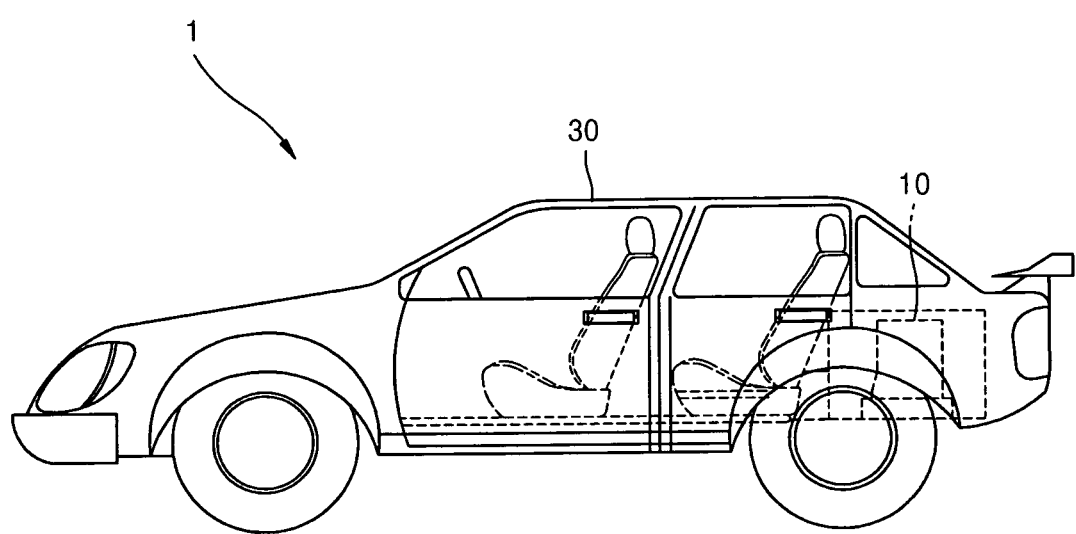

FIG. 8 illustrates an electric car 1 that employs the battery pack 10 FIG. 1, according to an embodiment.

Referring to FIG. 8, a battery module 100 may be formed by stacking a plurality of battery cells 110 in a horizontal direction. The battery pack 10 may be formed by stacking and connecting eight battery modules 100 in, e.g., four rows and two columns.

In this case, a lower frame 130 of each of the battery modules 100 may be combined with an upper frame 120 of a lower battery module 100 so as to form a degassing duct for discharging a gas.

The battery pack 10 may be disposed in a preset space of a body 30 of the electric car 1. The battery pack 10 including the battery cells 110 may generate a poisonous gas due to, e.g., an explosion or another reason. In this case, the poisonous gas may be explosively generated in a short time. If the poisonous gas flows into the space occupied by people, the people may be harmed by the gas.

The battery pack 10 may be accommodated and sealed in a sealing case that may be connected to an exterior of the electric car 1 through an external duct. Accordingly, the external duct may be connected to the battery pack 10 so as to discharge an exhaust gas outside the electric car 1.

The battery pack 10 may be installed in the body 30 of the electric car 1 using a quick drop method so as to be detachable from the electric car 1. The battery pack 10 may be cooled by providing and circulating a cooling fluid through the circulative fluid channel 410 illustrated in FIG. 3 so as to absorb heat and then cooling the cooling fluid at the outside of the battery pack 10.

As described above, according to one or more of the embodiments, as internal heat is emitted to an exterior of the battery pack due to fluid circulation, cooling characteristics of the battery pack may be improved.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
one or more battery modules, each battery module including one or more battery cells;
a cover for accommodating the one or more battery modules, the cover having an exterior surface;
a holder detachably coupled to the cover, the holder including a fluid tank and a pump, the holder supporting the one or more battery modules from below, the one or more battery modules extending upwardly from the holder, the cover surrounding all parts of the one or more battery modules that are above the holder; and
a circulative fluid channel through which a cooling fluid flows, the circulative fluid channel being associated with the cover, being coupled to the fluid tank and the pump, and having a channel length, a majority of the channel length disposed outside the holder and inside the exterior surface of the cover.

2. The battery pack as claimed in claim 1, wherein the cover includes:
a first cover facing outward and including the exterior surface of the cover; and
a second cover disposed within the first cover and spaced apart from the first cover.

3. The battery pack as claimed in claim 2, wherein:
the holder and the cover enclose the one or more battery modules therebetween, and
the circulative fluid channel is between the first cover and the second cover such that the cooling fluid is flowable from the fluid tank and back to the fluid tank through the circulative fluid channel.

4. The battery pack as claimed in claim 1, wherein the circulative fluid channel contacts an inner surface of the cover.

5. The battery pack as claimed in claim 1, wherein the circulative fluid channel is bent on an inner surface of the cover.

6. The battery pack as claimed in claim 1, wherein the holder supports the one or more battery modules from one surface of the one or more battery modules.

7. The battery pack as claimed in claim 1, wherein:
the fluid tank is detachably coupled to a first opening of the circulative fluid channel, the fluid tank being configured to contain the cooling fluid; and
the pump is detachably coupled to a second opening of the circulative fluid channel, the pump being configured to provide the cooling fluid in the fluid tank to the circulative fluid channel through the second opening, the fluid tank being configured to receive the cooling fluid from the circulative fluid channel through the first opening, wherein decoupling the cover from the holder simultaneously decouples the first and second openings of the circulative fluid channel from the fluid tank and the pump, respectively.

8. The battery pack as claimed in claim 7, wherein the holder supports the one or more battery modules from under one surface of the one or more battery modules, and the holder encloses the fluid tank and the pump therein.

9. The battery pack as claimed in claim 1, wherein the cooling fluid includes air, water, a refrigerant, or ethanol and glycerin.

10. The battery pack as claimed in claim 1, wherein:
the one or more battery cells of each of the one or more battery modules are stacked in a first direction, and the one or more battery modules are arranged along second and third directions different from the first direction, and
the circulative fluid channel is bent to extend as one continuous channel along each of the first, second, and third directions so as to be adjacent to sides of each of the one or more battery modules.

11. A battery pack, comprising:
one or more battery modules, each battery module including one or more battery cells;
at least one supporting frame having at least one surface on which the one or more battery modules are stacked,
a first fluid channel through which a cooling fluid flows and having a first fluid channel length, a majority of the first fluid channel length being in the at least one supporting frame;
a cover for accommodating the one or more battery modules and the at least one supporting frame, the cover having an exterior surface;
a holder detachably coupled to the cover, the holder including a fluid tank and a pump, the holder supporting the one or more battery modules from below, the one or more battery modules extending upwardly from the holder, the cover surrounding all parts of the one or more battery modules that are above the holder; and
a second fluid channel through which the cooling fluid flows, the second fluid channel being associated with the cover, being coupled to the fluid tank and the pump, and having a second channel length, a majority of the second channel length disposed outside the holder and inside the exterior surface of the cover.

12. The battery pack as claimed in claim 11, wherein the first fluid channel and the second fluid channel are connected to each other.

13. The battery pack as claimed in claim 11, wherein the cover includes:
a first cover facing outward and including the exterior surface of the cover; and
a second cover disposed within the first cover and spaced apart from the first cover.

14. The battery pack as claimed in claim 13, wherein:
the holder and the cover enclose the one or more battery modules therebetween, and
the second fluid channel is between the first cover and the second cover such that the cooling fluid is flowable from the fluid tank and back to the fluid tank through the second fluid channel.

15. The battery pack as claimed in claim 11, wherein the second fluid channel contacts an inner surface of the cover.

16. The battery pack as claimed in claim 11, wherein the second fluid channel is bent on an inner surface of the cover.

17. The battery pack as claimed in claim 11, wherein the holder supports the one or more battery modules from one surface of the one or more battery modules.

18. The battery pack as claimed in claim 11, further comprising:

the fluid tank is detachably coupled to a first opening of the second fluid channel, the fluid tank being configured to contain the cooling fluid; and the pump is detachably coupled to a second opening of the second fluid channel, the pump being configured to provide the cooling fluid in the fluid tank to the second fluid channel through the second opening, the fluid tank being configured to receive the cooling fluid from the second fluid channel through the first opening, wherein decoupling the cover from the holder simultaneously decouples the first and second openings of the second fluid channel from the fluid tank and the pump, respectively.

19. The battery pack as claimed in claim 18, wherein the holder supports the one or more battery modules from under one surface of the one or more battery modules, and the holder encloses the fluid tank and the pump therein.

20. The battery pack as claimed in claim 18, further comprising:

a plurality of supporting frames, and a distributor connected to a plurality of first fluid channels of the plurality of supporting frames, to the second fluid channel, and to the pump, the distributor being configured to distribute and provide the cooling fluid to the plurality of first fluid channels and to the second fluid channel.

21. The battery pack as claimed in claim 11, wherein the cooling fluid includes air, water, a refrigerant, or ethanol and glycerin.

22. A battery pack that effects heat dissipation by way of a cooling fluid, the battery pack comprising:

one or more battery modules, each battery module including one or more battery cells;

a cover for accommodating the one or more battery modules, the cover having an exterior surface;

a holder detachably coupled to the cover, the holder including a fluid tank and a pump, the holder supporting the one or more battery modules from below, the one or more battery modules extending upwardly from the holder, the cover surrounding all parts of the one or more battery modules that are above the holder; and a circulative fluid channel, the circulative fluid channel being associated with the cover, being coupled to the fluid tank and the pump, and having a channel length, a majority of the channel length disposed outside the holder and inside the exterior surface of the cover.

* * * * *